May 10, 1927.

H. P. RHODES 1,627,620

FLEXIBLE METALLIC PACKING

Filed July 18, 1925

Hampton P. Rhodes, Inventor

By Jesse R. Stone, Attorney

Patented May 10, 1927.

1,627,620

UNITED STATES PATENT OFFICE.

HAMPTON PRATT RHODES, OF HOUSTON, TEXAS.

FLEXIBLE METALLIC PACKING.

Application filed July 18, 1925. Serial No. 44,448.

My invention relates to packing for use in stuffing boxes in maintaining a tight closure about moving shafts and is particularly adapted for use where heat is encountered.

It is an object of the invention to provide metallic packing which will be heat resistant and which will be so constructed as to be self-lubricating.

It is also desired to so form the packing that it will be flexible and easily adjusted into position about the rod which is to be packed.

Figure 1:
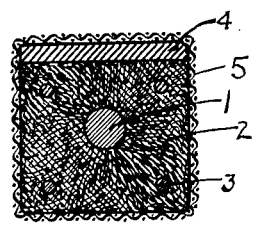
Figure 2:
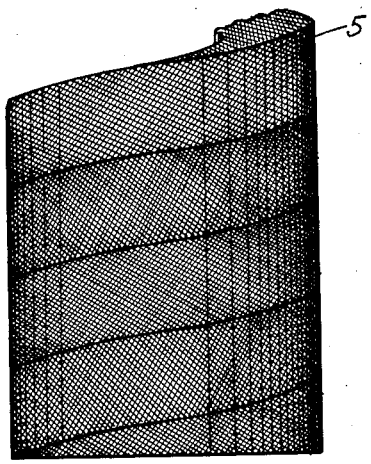

Referring to the drawing herewith, in which the preferred embodiment of my invention is shown, Fig. 1 is a transverse section through a strip of packing material constructed in accordance with my invention. Fig. 2 is a side elevation of a coil of packing material illustrating the manner in which the packing strip may be compressed to fit about the rod.

In the formation of the body of the packing material I contemplate the use of strips of metal foil of which Babbitt metal is the preferred constituent. The strips of foil are compressed together in interlocked position about a central core 1. The compressed foil 2 is preferably formed into rectangular shape about the core although obviously the shape may be varied as desired for the particular purpose to which it is put.

The core 1 is preferably of asbestos and comprises a cord, or wick, of asbestos material adapted to absorb a quantity of lubricant. The wick, or core, of asbestos thus obtained is saturated with lubricant before the metal foil 2 is compressed about the core in interlocked position.

In forming the metal about the core, I use a plurality of smaller cords or wicks 3 of asbestos distributed in the metal foil in such a manner as to render the same somewhat more compressible and also acting to lubricate the metal foil in the same manner as does the central core. These cords of asbestos are saturated in the same manner as the central core. It is also desired that the strips of metal foil be covered with a small amount of lubricant, such as graphite and oil, so that when compressed in position the entire body of the packing will have intimate association therewith a sufficient supply of lubricating material.

On the side of the body of the packing thus formed I place a flat strip or layer 4, also of asbestos. This layer is to be held in position against the body of the metallic packing by means of an outer covering 5, of fabric or braided material, which encloses the entire body of the packing and holds it in shape, allowing it to conform however to the position of the stuffing box in which it is placed. The strip 4 of asbestos is also supplied with lubricant to assist in preventing the packing from becoming dry in use.

The packing thus formed of compressed metal foil with the wicks of asbestos extending longitudinally therethrough is particularly efficient in its operation. The metal foil furnishes an excellent bearing for the moving rod, or shaft, and the manner in which the lubricant is maintained in contact with the foil during use has been found to entirely eliminate the necessity of further lubrication. The packing easily conforms to the shape of the box in which it is placed and will wear for long periods of time and has been found to be a particularly durable type of bearing for the moving shaft. The strip of asbestos 4 is ordinarily placed on the side of the packing away from the rod and forms a seat against the box in which the packing is placed. It assists in lubricating the packing and forms a compressible and somewhat resilient seat for the body of the packing strip. The advantages of this construction will be apparent to those skilled in the art.

What I claim as new and desire to protect by Letters Patent is:

1. A flexible metallic packing comprising a central core of asbestos, a heavy layer of metal foil compressed in interlocked position around said score, a plurality of smaller threads of asbestos extending longitudinally of the metal foil, a layer of asbestos on one side of the compressed metal foil, and a covering of flexible material surrounding said packing, said core and asbestos threads being saturated with lubricant.

2. A flexible metallic packing comprising a central core of oil-soaked asbestos, a body of metal about said core composed of strips of Babbitt foil compressed longitudinally in interlocked position about said core, a plurality of asbestos threads in said strips away from said core, a cushion of heat resisting material on one side of said packing, and a flexible covering, said asbestos threads and said cushion having lubricant therein.

3. A flexible metallic packing comprising a central cylindrical core of asbestos, lubricant in said core, longitudinal strips of Babbitt foil interlocked about said core and entirely surrounding the same, means spaced from said core to convey lubricant to said foil away from said core, a cushion of asbestos across one side of said packing and a flexible covering thereon in the manner described.

In testimony whereof I hereunto affix my signature this 11th day of July, A. D. 1925.

HAMPTON PRATT RHODES.